United States Patent [19]
Kaire

[11] Patent Number: 4,536,616
[45] Date of Patent: Aug. 20, 1985

[54] MICROPHONE OR MOUTHPIECE SIGNAL SUPPRESSION CIRCUIT

[75] Inventor: Jean C. Kaire, St. Egreve, France

[73] Assignee: Thomson-CSF, Paris, France

[21] Appl. No.: 566,434

[22] Filed: Dec. 28, 1983

[30] Foreign Application Priority Data

Dec. 28, 1982 [FR] France .................. 82 21865

[51] Int. Cl.³ ............................ H04M 1/58
[52] U.S. Cl. ............................... 179/81 A
[58] Field of Search ............ 179/81 A, 81 R, 16 F

[56] References Cited

U.S. PATENT DOCUMENTS

| | | | |
|---|---|---|---|
| 3,708,630 | 1/1973 | Matsuda et al. | 179/81 A |
| 3,745,261 | 7/1973 | Friedman | 179/81 R |

FOREIGN PATENT DOCUMENTS

| | | |
|---|---|---|
| 1525057 | 2/1978 | Fed. Rep. of Germany. |
| 2161662 | 7/1973 | France. |

*Primary Examiner*—Gene Z. Rubinson
*Assistant Examiner*—James L. Dwyer
*Attorney, Agent, or Firm*—Oblon, Fisher, Spivak, McClelland & Maier

[57] ABSTRACT

The invention relates to a circuit for a telephone set. In order to eliminate the mouthpiece signal between the receiver and the telephone set, there are provided a subtraction means receiving the mouthpiece signal and the composite signal present on the telephone line, one of the two being produced by different compensation impedances, and on the other hand a mixer controlled by a circuit as a function of the telephone line impedance. The two compensation impedances respectively correspond to the compensation of a long line and the compensation of a short line and the output of the mixer supplies a signal mixture, with variable proportions, which effectively suppresses the mouthpiece signal, no matter what the length of the telephone line.

8 Claims, 6 Drawing Figures

MICROPHONE OR MOUTHPIECE SIGNAL SUPPRESSION CIRCUIT

BACKGROUND OF THE INVENTION

1. Field of the Invention

A conventional telephone set is connected to a double-conductor telephone line, whose two conductors carry a composite signal comprising both a signal transmitted by the telephone and a signal received by the telephone.

2. Description of the Prior Art

In order to be able to hear the voice of the other person in a receiver (received signal), the receiver must be connected to the line. However, if it is directly connected, the composite signal, i.e. not only the received signal but also the transmitted signal will be heard in the receiver. Thus, the user of the telephone hears himself speak in the receiver, which is disturbing. Moreover, there is a risk of microphony between the mouthpiece and the receiver. Thus, a so-called "antilocal" circuit is provided, which is a microphone or mouthpiece signal suppression circuit receiving the transmitted signal (mouthpiece signal) and the composite signals present on the line in order to subtract the first from the second and obtain a signal, which is essentially the received signal, and which can be tranmsitted to the receiver.

Thus, a priori, the suppression circuit essentially comprises a subtracter, which receives the composite signal on the line and the signal from the mouthpiece.

Thus, it is necessary to also provide impedance matching, in order that the subtraction takes place on the signal circulating in the equivalent impedances, otherwise the reflections produced would deteriorate the quality of the subtraction.

Two examples of conventional microphone or mouthpiece signal suppression circuits are shown respectively in FIGS. 1 and 2.

In FIG. 1, the telephone line is represented by two conductors 10 and 12 reaching the two terminals 14 and 16 of the telephone. Terminal 16 is considered to be the earth terminal.

The mouthpiece of the telephone hand set is designated by reference numeral 18 and the receiver by reference numeral 20. The mouthpiece is connected to the input of an amplifier 22, which supplies a mouthpiece signal M. The latter is applied to the telephone line by an amplifier 24, which can have a gain K. The composite signal S present on conductor 16 consists of a combination of mouthpiece signal and a received signal and which is heard through receiver 20.

The impedance of the telephone line is symbolically represented by a terminating impedance 26, connected to the end of the line and whose value is Z.

The mouthpiece signal suppression circuit takes account of this impedance and, in FIG. 1, comprises a compensation impedance 28 connected between the terminal 14 receiving the telephone line and a positive input of a subtractor 30, whereof a negative input also receives the mouthpiece signal M and whose output drives an amplifier 32 connected to the receiver 20.

The compensation impedance has a structure (resistor and capacitor network) taking account of the impedance value Z of the line, as well as the gain K of the amplifier 24 towards the line.

FIG. 2 shows a constructional variant, in which the same elements are designated by the same references. The only difference is that the positive input of subtractor 30 is connected directly and not via a compensation impedance to conductor 10 of the telephone line (terminal 14). The compensation impedance 28 (which does not have the same structure as in FIG. 1) is replaced at the output of the mouthpiece amplifier 22, between said output and the second terminal 16 (earth) of the telephone line.

It is also possible to provide other connections (e.g. bridge connections). All these connections suffer from a major disadvantage, namely the satisfactory operation of the suppression circuit requires a precise matching between the compensation impedance value and the line impedance value. However, the line impedance varies greatly with the line length and type (diameter, etc). It is therefore necessary to adjust or modify the compensation impedance in order to individually match it to each telephone, as a function of its geographical position with respect to a telephone exchange. This obviously leads to additional manufacturing costs (regulatable elements) and higher installation costs (controls to be carried out during the installation). It is therefore preferred to use an impedance value corresponding to a line of average length, but the results are far from satisfactory.

It has also been proposed to switch the compensation impedance between two values, one corresponding to shorter lines and the other to longer lines, switching taking place automatically on the basis of a direct current and/or a d.c. voltage measurement on the telephone line, because said current or voltage can be a good indication of the line impedance.

However, this switching between two impedance values still gives unsatisfactory results. In order to improve these results, it is necessary to have a much more precise switching between the numerous possible impedance values, which would make the circuitry of the telephone set much more complicated. It would also be conceivable to construct a continuously variable impedance (variable resistor, variable capacitance diode) as a function of an electrical signal, but this would lead to design and construction problems.

SUMMARY OF THE INVENTION

The present invention proposes a simple solution for improving mouthpiece signal suppression circuits which does not involve the construction of complex circuits of considerable size.

The Applicant has found that it was not necessary to have a large number of different compensation impedances which are to be switched in order to choose a desired value. Thus, it is possible to independently pass a signal through two different compensation impedances and mix the resulting signals with variable proportions (from 0 to 100%). It is then found that the result is substantially equivalent to what would be obtained by passing the signal into an impedance having a value intermediate between the values of these two impedances, said intermediate values varying directly as a function of the signal mixing proportion.

Under these conditions, it is possible to choose as the compensation impedances, the values necessary for the matching of the shortest line and the longest line (and not to a mean short line value and a mean long line value). The proportions of the mixture can be directly controlled between 0 to 100% by an information such as the direct current or the d.c. voltage on the line, said information approximately, but effectively indicating the line length and impedance.

Thus, the mouthpiece signal suppression circuit according to the invention comprises two different compensation impedances, one of which carries out an impedance matching for a short telephone line and the other an impedance matching for a long telephone line, a signal mixer connected to the two compensation impedances for mixing signals modified by these two impedances with controlled variable proportions, a control circuit receiving a signal representing the impedance of the telephone line and controlling the mixer in order to check the proportions of the mixture as a function of the line impedance, and an addition or subtraction means receiving the composite line signal and the mouthpiece signal, of which at least one is modified by the compensation impedances.

BRIEF DESCRIPTION OF THE DRAWINGS

The invention is directed in greater detail hereinafter relative to non-limitative embodiments and the attached drawings, wherein show.

DETAILED DESCRIPTION OF THE INVENTION

Throughout the remainder of the description, it should be understood that the essential functions of the circuit according to the invention (impedances, mixer, subtracter) are overall functions present in the circuit even if, for design optimization reasons, these functions are intimately mixed. Thus, the subtraction function can be carried out by an adder preceded on one input by an inverter. This subtraction or addition function can also be incorporated into the mixer, or can be placed either upstream or downstream of the mixer.

Moreover, it should be understood that it is possible to use at random the notions of the subtraction means or the addition means. What is sought is to subtract the transmitted signal from the composite signal. However, if for example, the line amplifier 24 inverts the signal which it amplifies, the subtraction function must be replaced by an addition function. It is possible to generalize this function by the term signed addition function.

Figure 1:
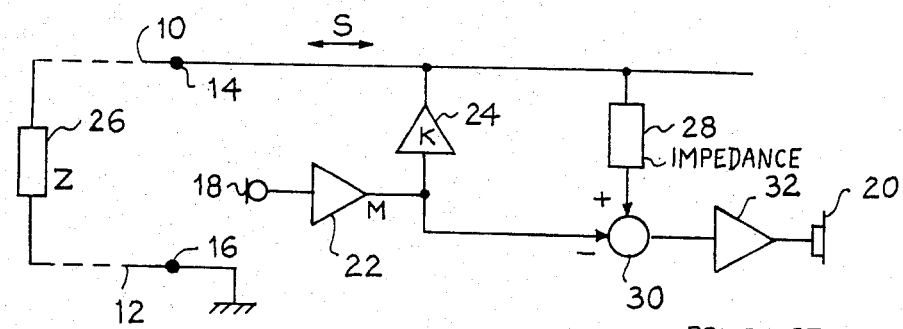
FIGS. 1 and 2, already described, two prior art signal suppression circuits.
Figure 2:
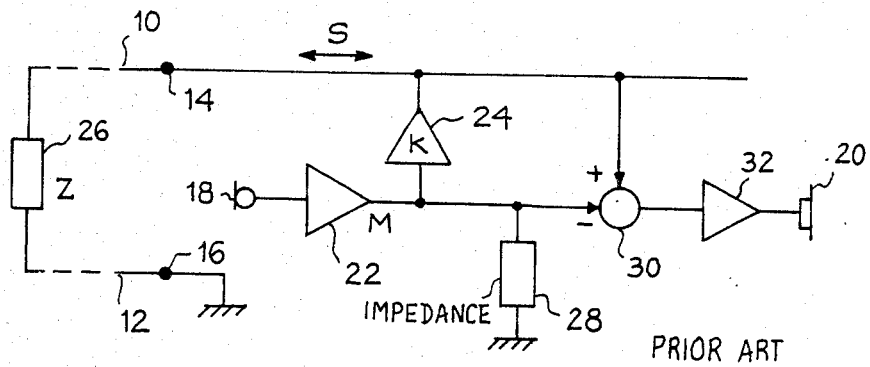
Figure 3:
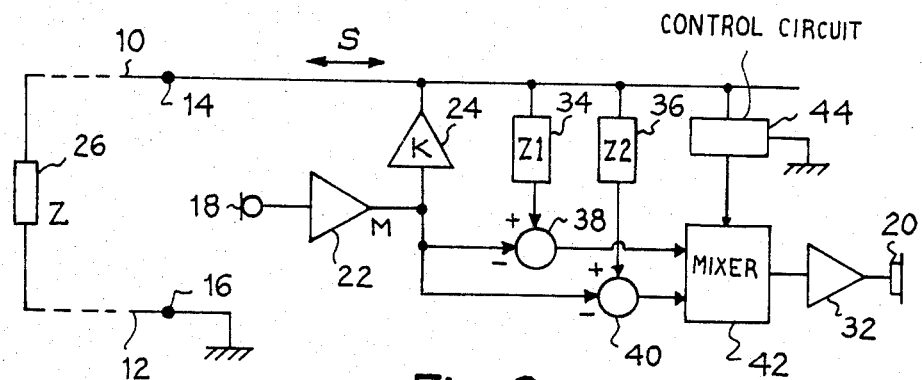
FIG. 3 a block diagram according to the invention.

FIG. 3 is an example of a block diagram according to the invention. The elements identical to those of FIGS. 1 and 2 are numbered in the same way and will not be described again, i.e. line conductors 10 and 12, correspond telephone terminals 14, 16, mouthpiece 18, mouthpiece amplifier 22, receiver 20, line amplifier 24, receiver amplifier 32 and equivalent line impedance 26.

Two compensation impedances 34 and 36 are provided, one of which 34 corresponds to the compensation of a line having the shortest envisaged length. It is connected between the terminating telephone line terminal 14 and a positive input of a subtractor 38, whereof a negative input is also connected to the output of the mouthpiece amplifier 22 and consequently receives the mouthpiece signal. The other compensation impedance 36 corresponds to the compensation of a line having the longest envisaged length. It is connected between the terminating telephone line terminal 14 and a positive input of another subtractor 40, whereof a negative input is also connected to the output of the mouthpiece amplifier 22.

The outputs of subtracters 38 and 40 are connected to a mixer 42, which has the function of supplying at its output a signal proportional to a mixture of two input signals, the proportion of the mixture being controllable by a signal from a control circuit 44.

Control signal 44 establishes a signal on the basis of an electrical voltage or direct current information present on the telephone line, in such a way that the proportions of the signal mixture are directly a function of a magnitude which substantially represents the line impedance Z.

Thus, it can be provided that the proportions of the mixture vary between 0 and 100% in a substantially linear manner with respect to the direct current variations on the line. The output of the mixer is applied to the input of amplifier 32 of receiver 20.

Thus, in this example, mixer 42 mixes two signals, each modified by one of the compensation impedances. The subtraction means comprises two subtracters receiving signals, each of which is modified by one of the compensation impedances.

Figure 4:
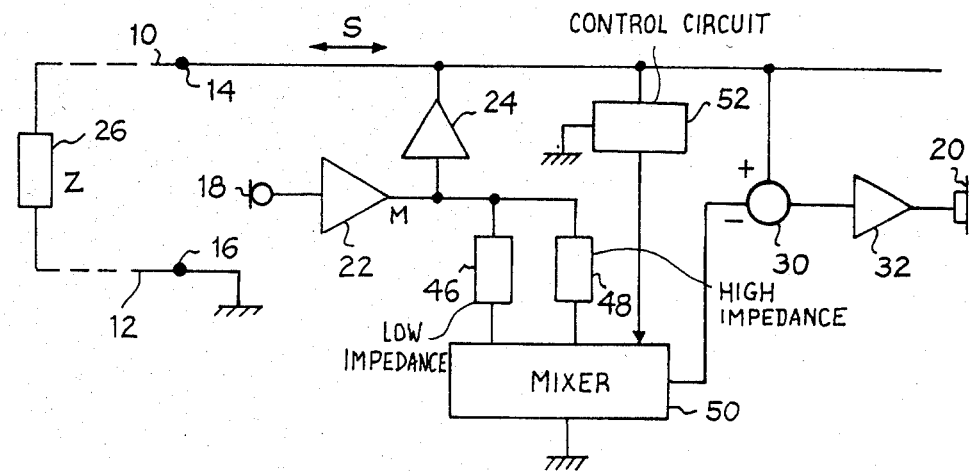
FIG. 4 another example of a possible block diagram according to the invention.

In another configuration shown in FIG. 4, the circuit according to the invention can comprise two compensation impedances arranged in a different way. The configuration of FIG. 4 is similar to the diagram of FIG. 2 (compensation impedance connected to the output of the mouthpiece amplifier), in the same way as the configuration of FIG. 3 is similar to the diagram of FIG. 1 (compensation impedance connected to the telephone line).

In FIG. 4, the following elements are the same as the preceding drawing: line conductors 10, 12, terminals 14, 16, mouthpiece 18, receiver 20, mouthpiece amplifier 22, line amplifier 24, equivalent line impedance 26 and receiver amplifier 32.

Two compensation impedances 46, 48 are provided, one of these 46 corresponds to the compensation of the shortest envisaged telephone line. It is connected between the output of mouthpiece amplifier 22 and a first input of a mixer 50. The second impedance 48 corresponds to the compensation of the longest envisaged telephone line and is connected between the output of mouthpiece amplifier 22 and a second input of mixer 50.

Mixer 50 has the same function as mixer 42 of FIG. 3. The proportions of the mixture are controlled by a control circuit 52, which has the same function as circuit 44 of FIG. 3 and which can be realised in the same way.

The output of mixer 50 is applied to a negative input of a subtracter 30, whereof a positive input is connected to the incoming terminal 14 of the telephone line. The subtracter output supplies to the amplifier 32 of receiver 20 the signal which has to be received by the receiver. In this case, the subtraction means receive the output signal modified by the two compensation impedances, but after passing through the mixer.

Figure 5:
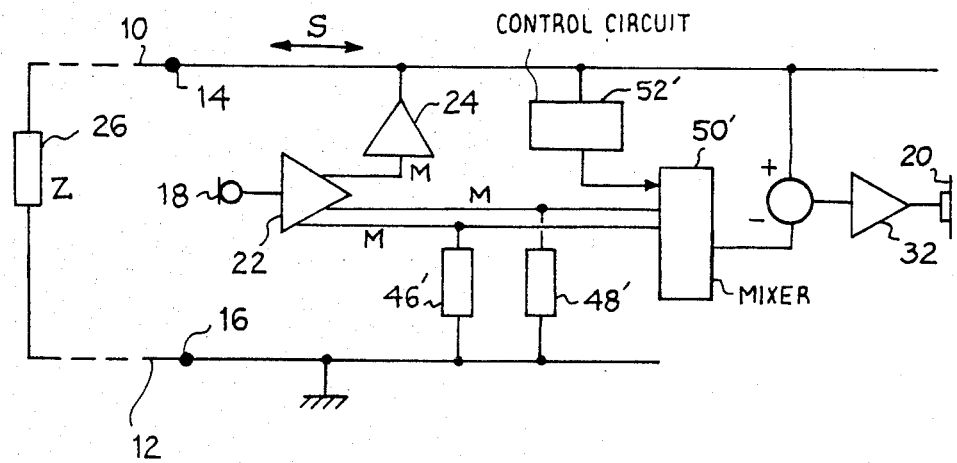
FIG. 5 a third example of a possible block diagram according to the invention.

A third embodiment is shown in FIG. 5, in which it is assumed that the mouthpiece amplifier 22 has two independent outputs, each supplying the same signal M in the form of a current. These outputs are in each case connected to one input of a mixer 50' and also to one end of a respective compensation impedance 46' (short line) and 48' (long line), which are also connected to the earth terminals 16. The output of mixer 50' is connected to one input of a subtracter 30, whereof the other input is connected to the telephone line (terminal 14) and whereof the output is connected to the receiver amplifier 32. A control circuit 52' regulates the proportions of the mixture, as in FIGS. 3 and 4.

There are numerous possibilities for realising the different elementary functions of the circuits of FIGS. 3, 4 and 5 and only a single particularly interesting example will be given. This is shown in FIG. 6 and essentially corresponds to the block diagram of FIG. 3.

In the circuit of FIG. 6, there are once again telephone line conductors 10, 12, terminals 14, 16, mouthpiece 18, mouthpiece amplifier 22, receiver amplifier 32 and receiver 20. The two compensation impedances are again designated 34 (short line) and 36 (long line). The line amplifier, which is assumed to be non-inverting, is not shown. Each compensation impedance can comprise a resistor in series with a parallel assembly of a resistor and a capacitor.

Figure 6:
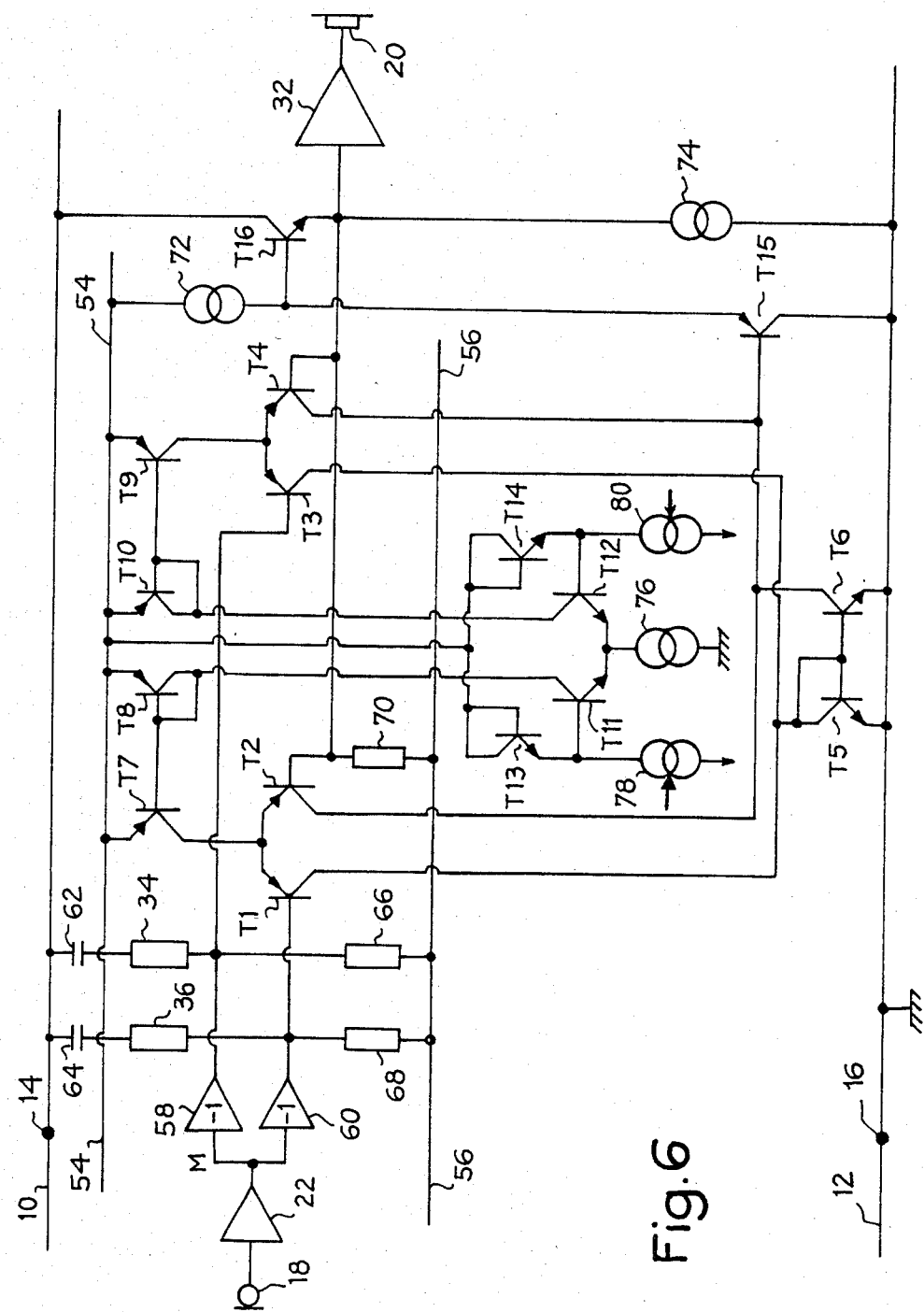
FIG. 6 a detailed embodiment of the invention.

All the other elements of FIG. 6 are used for carrying out the various functions of elements 38, 40, 42, 44 of FIG. 3 (subtraction, mixing, controlling the proportions of the mixture).

The circuit of FIG. 6 uses reference d.c. voltages established (by not shown means) on conductors 54 (approx. 2.5 V) and 56 (approx. 1.2 V), it being assumed that the earth is connected to terminal 16. However, the voltage on conductor 54 is of a purely continuous nature, e.g. obtained at the terminals of a storage capacitor, whilst line 56 defines a mean reference voltage, which does not short-circuit the alternating signals which may pass there.

The circuit essentially comprises a first differential stage essentially constituted by two pnp transistors T1 and T2 and a second differential stage formed by two pnp transistors T3 and T4. These two stages are connected to a common polarization or biasing stage formed by two npn transistors T5 and T6, arranged in current mirror-like manner. The first differential stage is supplied with current across a pnp transistor T7, which repeats the current of a pnp transistor T8 and the second differential stage is supplied with current across a pnp transistor T9, which repeats the current of a pnp transistor T10.

A third differential stage with four npn transistors T11, T12, T13, T14 is used for unbalancing the currents in transistors T8 and T10 (which constitute the charges of this third stage), in order to regulate the proportions of the mixture of signals arriving in the polarization stage via each of these first two differential stages.

Finally, an output stage, which samples the signals of the common polarization stage supplies the receiver amplifier with the desired signal. The output stage comprises a pnp driving transistor T15 and a npn transistor T16.

The input of each differential stage is on the base of one of the transistor (T1 or T3 respectively) constituting said stage, whilst the base of the other transistor (T2 or T4) is connected to the output of the output stage (emitter of transistor T16) as a negative feedback giving a unitary fixed gain to the complete circuit.

The differential stages are not used as subtracters and are in fact used as adders (the addition taking place at the input of the stage, on the base of transistor T1 or T3). It is therefore necessary to provide for an inversion of the signal of the mouthpiece or the line prior to this addition (unless amplifier 24 is itself inverting).

For this purpose, at the output of mouthpiece amplifier 22, there are two impedance matching and inverting stages 58 and 60, whose outputs are respectively connected to the base of transistor T1 and to the base of transistor T3 (i.e. to the inputs of the first and second differential stages). Moreover, the compensation impedances 36 and 34 are respectively connected to the base of transistor T1 and to the base of transistor T3.

The addition of the signals from on the one hand the mouthpiece and on the other hand the telephone line across impedances 34 or 36 takes place on said bases. The other end of impedances 34 and 36 is connected, across capacitors 62 and 64 respectively preventing the passage of a direct current in said impedances, to terminal 14 of the telephone set.

The bases of transistors T1 and T3 are connected by the respective resistors 66 and 68 to conductor 56. Resistors 66 and 68 are used for converting into voltage variations, the current variations across impedances 34 and 36. The summation of the signals at the inputs of the first and second differential stages takes place in said resistors. The bases of transistors T2 and T4 are connected to conductor 56 by a polarization resistor 70.

The emitters of transistor T1 and T2 are connected and are connected to the collector of transistor T7, whose emitter is connected to conductor 54, thus forming a conventional differential stage. The same applies with respect to transistors T3 and T4, whose emitters are connected to the collector of transistor T9 whilst the emitter of the latter is connected to conductor 54.

The collectors of transistors T1 and T3 are connected to the collector of transistor T5 which is connected in diode-like manner (collector and base connected), the emitter of transistor T5 being at earth (terminal 16).

The collectors of transistors T2 and T4 are connected to the collector of transistor T6 which is connected as a transistor for repeating the current in transistor T5 (emitters connected and bases connected).

Transistors T5 and T6 form the polarization stage which is common to the differential stages and the output of said stage, with the mixed signals, is connected to the collector of transistors T6 (these transistors also form an active charge for the differential stages). This output is connected to the base of driving transistor T15, whose collector is connected to earth and whose emitter is connected on the one hand to a polarizing current source 72 (supplied e.g. by conductor 54) and on the other hand to the base of transistor T16. The collector of transistor T16 is connected to the telephone line (terminal 14) and its emitter (which constitutes the output of the circuit connected to the input of the receiver amplifier 32) is connected on the one hand to a polarizing current source 74 also connected to earth, and on the other hand to the bases of transistors T2 and T4 in order to constitute the aforementioned negative feedback by which a fixed overall gain is ensured, no matter what the proportions of the mixture effected by the circuit. In other words, the gains of the two mixed signals are respectively proportional to a factor x and to a factor 1−x as a result of this negative feedback of the circuit output to the inputs of the differential stages.

The respective gains x and 1−x are established by the unbalance of the current supplying the first and second differential stages, i.e. on the basis of the current circulating in transistors T7 and T9.

As these transistors repeat the currents of transistors T8 and T10 respectively (common bases and common emitters for T7 and T8 on the one hand and T9 and T10 on the other) the unbalance of the currents occurs in transistors T8 and T10. These transistors are connected in diode-like manner (base and collector connected) and constitute the charges of the third differential stage. Their emitters are connected to conductor 54 and their collectors are respectively connected to the collector of transistor T11 and to the collector of transistor T12. The emitters of the two latter transistors are connected and are also connected to a current 76, which is also connected to the earth terminal 16.

The bases of transistors T11 and T12 are polarized or biased on the basis of conductor 54 by respective diodes T13 and T14 (diode-connected transistors). These diodes are forward biased and are used for linearizing the gain of the differential control stage constituted by transistors T11 and T12. Finally, the bases of transistors T11 and T12 are connected to control current sources symbolically represented by references 78 and 80, which supply control currents as a function of an information representing the line impedance.

The example, the telephone set comprises, in a part of the circuit which is not shown because it does not form part of the invention, a Zener diode (in direct current) formed on the basis of a transistor, whose current can be repeated to constitute the source 78 of FIG. 6. It is also possible to differently treat the repeated current for forming source 78. This Zener diode is connected between terminals 14 and 16 and the continuous current consumed by this diode, i.e. also the repeated current, is a good indication of the impedance and length of the line. Source 80 can be an optionally regulatable or variable constant current source.

For a line having the greatest possible length, the current of source 78 is very low compared with that of source 80. Diode T13 is less conductive than diode T14. The base potentials of transistors T11 and T12 are unbalanced and transistor T11 is much more conductive than transistor T12. This unbalance has repercussions on transistors T8 and T10 and then on transistors T7 and T9, which supply the first and second differential stages. The gain of these stages is proportional to the current passing through them. Thus, the gains are also unbalanced, so that the signals applied to the bases of transistors T1 and T3 are amplified with very different gains and are mixed in the common polarization stage.

However, transistor T1 receives the (inverted) mouthpiece signal and the composite signal of the telephone line after passing through impedance 36, these signals being added on the base as a result of resistor 68. In the same way, the base of transistor T3 receives the (inverted) mouthpiece signal and the composite signal of the line after passing through impedance 34, the signals being added on the base as a result of resistor 66.

Thus, in the case of a long telephone line, the mixture of the signals is very unbalanced in favour of the first differential stage and it corresponds to the passage of a signal virtually only through the compensation impedance 36, thus corresponding to the compensation for a long line.

Conversely, if the line is very short, the current source 78 will be much larger than source 80 and the unbalance will be in the other direction, i.e. passage of the signal solely across the compensation impedance 34, corresponding to the compensation for a short line.

In the case of intermediate lines, mixing takes place in proportion to the lengths.

The various functions mentioned in connection with FIG. 3 are shown in the circuit of FIG. 6.

The Expert could use this circuit as a basis for realising a circuit more specifically corresponding to the block diagram of FIG. 4 or FIG. 5, or also other connections or circuits, such as for example an impedance bridge connection. Bridge connections have already been proposed for use as an antilocal circuit, the telephone line itself forming one arm of the bridge. In this case, another arm of the bridge comprises an impedance, which balances the line impedance. Instead of providing a single matching impedance, or two switchable impedances (one for a long line and the other for a short line), or a plurality of switchable impedances, according to the invention two impedances are provided, which respectively correspond to a long line matching and a short line matching, together with a signal mixer, which injects into the bridge a mixture of the signals circulating in these impedances, the proportion of the mixture being controlled by a signal (direct current) representing the line impedance.

In general terms, the circuit elements having nothing to do with the invention are not shown in the drawings (e.g. diode bridges, protection, etc).

What is claimed is:

1. A mouthpiece signal suppression circuit for a telephone set, which telephone set includes a mouthpiece amplifier supplying a mouthpiece signal to a line amplifier, which transmits this mouthpiece signal on a telephone line, a receiver amplifier supplying a signal to a receiver with the mouthpiece signal suppression circuit receiving on the one hand the mouthpiece signal and on the other hand a composite signal from the line, in order to supply the telephone receiver with a signal essentially corresponding to the composite signal, from which has been subtracted the mouthpiece signal, wherein said suppression circuit comprises:

two different compensation impedances, one of which provides an impedance matching for a short telephone line and the other an impedance matching for a long telephone line, a signal mixer for mixing signals modified by said two impedances with controlled variable proportions, a control circuit receiving a signal representing the impedance of said telephone line and controlling said signal mixer in order to check the proportions of the mixture of said mixing signal as a function of the impedance of said line, and a signed addition function means receiving the composite line signal and the mouthpiece signal wherein at least one of said composite line signal and said mouthpiece signal is modified by said compensation impedances.

2. A circuit according to claim 1, wherein the compensation impedances are in each case connected between a conductor of the telephone line and an input of a respective signed adder, whereof the other inputs receive the mouthpiece signal and whereof the outputs are applied to the mixer.

3. A circuit according to claim 2, wherein the mouthpiece signal is applied to two impedance matching means, whose outputs are connected to respective resistors and to respective compensation impedances.

4. A circuit according to claim 2, wherein the mixer comprises a first and a second differential stage, as well as a common polarization stage on which is sampled a mixed signal, and controlled current sources for supplying the two differential stages.

5. A circuit according to claim 4, wherein the circuit for controlling the proportions of the mixture comprises a third differential stage controlled so as to unbalance the current sources supplying the first and second differential stages.

6. A circuit according to one of the claims 1 to 4, wherein the circuit for controlling the proportions of the mixture receives a signal which is a function of the direct current consumed by the telephone line.

7. A circuit according to claim 1, wherein the compensation impedances are in each case connected between the output of the mouthpiece amplifier and a respective input of the mixer, whereof the output is applied to an input of a signed adder, whereof another input is connected to the telephone line and whereof the output is connected to the receiver amplifier.

8. A circuit according to claim 1, wherein the mouthpiece amplifier has at least two independent outputs, two of said at least two outputs supplying a current signal and being connected to the inputs of the mixer, the compensation impedance being in each case connected between a respective one of said outputs of the mouthpiece amplifier and a ground terminal.

* * * * *